US005313209A

United States Patent [19]

Michaels, Jr. et al.

[11] Patent Number: 5,313,209

[45] Date of Patent: May 17, 1994

[54] SWEEP JAMMER IDENTIFICATION PROCESS

[75] Inventors: Paul A. Michaels, Jr., Ocean Grove; Ralph J. Romano, Jackson, both of N.J.; Francis Giordano, Brooklyn, N.Y.

[73] Assignee: The United States of America as represented by the Secretary of the Army, Washington, D.C.

[21] Appl. No.: 152,601

[22] Filed: Nov. 12, 1993

[51] Int. Cl.[5] .................... G01S 7/38

[52] U.S. Cl. .................... 342/13; 342/14

[58] Field of Search .................... 342/13, 14, 192

[56] References Cited

U.S. PATENT DOCUMENTS 3,879,732 4/1975 Simpson .................... 342/14

4,454,513 6/1984 Russell .................... 342/14

4,581,767 4/1986 Monsen .................... 342/14 X 5,001,771 3/1991 New .................... 342/14 X

*Primary Examiner*—Gilberto Barrón, Jr.

*Attorney, Agent, or Firm*—Michael Zelenka; James A. DiGiorgio

[57] ABSTRACT

A process for accurately predicting the effects of a sweep jammer signal, whose waveform is given, on a targeted radio receiver communication link whose signaling curve is known. The process analyzes the critical physical and electrical characteristics of both the sweep jamming signal and the targeted radio receiver, and determines whether the sweep jammer signal is perceived by the receiver as being a sweep jammer, a barrage jammer, or something in between the two. Moreover, the process determines the jamming signal's effect on the receiver's peak and background Bit Error Rates which are then used to accurately calculate the sweep jamming signal's effect on the average Bit Error Rate.

4 Claims, 1 Drawing Sheet

SWEEP JAMMER IDENTIFICATION PROCESS

GOVERNMENT INTEREST

The invention described herein may be manufactured, used, and licensed by or for the Government of the United States of America for governmental services without the payment to us of any royalty thereon.

FIELD OF INVENTIONS

This invention relates to the field of electromagnetic signal analysis, and more particularly to a means of analyzing the affect of a sweep jammer signal on a targeted radio receiver to predict the jamming signal's net affect on the quality of the radio link in terms of its link Bit Error Rate (BER).

BACKGROUND OF THE INVENTION

A jamming device transmits an electromagnetic RF jammer signal in the form of a broad band barrage jamming signal or a sweep jammer signal into a predetermined frequency spectral range in which its targeted radio links operate. When the jammer signal is of the form of broadband barrage noise, the effect on the receiver is readily calculable. When, however, the radiated jammer signal is in the form of an instantaneous jammer signal of a given bandwidth swept across the targeted frequency spectrum, the affect on the targeted receivers has heretofore been less easy to predict. The effects of such a sweep jammer signal on a receiver depends on the electrical and physical characteristics of both the targeted receiver and the transmitted jamming signal. The various possible parameters produce a wide variety of possible affects on the targeted radio's communications ranging from no effect at all to total blockage of digital radio communications.

The main concern of both the radio operator and the jamming device operator is the effect the sweep jamming signal will have on the average link Bit Error Rate of the targeted radio link. It is therefore very desirable to those skilled in the art to be able to accurately predict the extent to which the link BER will be increased when the radio receivers are exposed to a sweep jammer signal. Such information is crucial for determining whether a given jamming device can successfully block digital radio communications (as in a combat environment).

There is presently no known process that can be used to accurately predict the affects of a sweep jammer signal on digital communications links. In fact, the few existing processes that attempt to perform this function have been shown, after being subjected to careful scrutiny in field tests, to be very inaccurate. This includes those processes currently being used in: (1) the Network Planning Terminal (NPT), (2) the Mobile Subscriber Equipment System Performance Prediction Model (MSE SPM), (3) the MOSES-I and MOSES-II (Mobile Subscriber Equipment Simulation) devices, (4) the Network Assessment Model (NAM), (5) the MSE Performance Assessment Model (MSE PAM), and (6) the Communications Electronics Warfare Model (COM EW).

One process that was examined in extensive detail was the one used in the MSE SPM model. This process, like all the others, was incorrect and very inaccurate in its calculation of the effect of the sweep jammer on the link average Bit Error Rate. The reason for this was the use of an incorrect duty cycle and an absence of an explicit dependance on the jamming signal's sweep rate necessary to compute the sweep jammer's pulse attenuation. As a result, these processes give an inaccurate prediction of the expected link BER because they fail to consider: (1) the jammer pulse is attenuated by the receiver (depending on the instantaneous sweep jammer bandwidth, sweep jammer sweep bandwidth, sweep jammer sweep rate, and receiver time constant), and (2) the net increase in the ambient background noise when the sweep jammer pulse is attenuated.

Moreover, it was noticed that the process utilized by the MSE SPM made link BER predictions that were independent of the sweep jammer's sweep rate. The other models were observed to have even poorer processes or none at all.

Consequently, those skilled in the art realize the need for a process that can provide accurate predictions for all sweep rates. Moreover, those skilled in the art realize the need for a process that can accurately perform the following functions:

1. Determine the link bit error rate for all realizations of jammer sweep rate.
2. Predict the expected BER in terms of an average BER, a peak BER, and a background BER for those cases where the sweep jammer is perceived by the receiver as being a sweep jammer or something in between being perceived as sweep jammer and a barrage jammer.
3. Determine whether a transient sweep jammer signal is perceived by the receiver as being a series of transients (occurring at the sweep rate), or a series of attenuated transients (occurring at the sweep rate) with a concurrent increase of the background noise floor, or simply an increased noise floor (a barrage jammer) because of the total inability of the receiver to follow the rise and fall of the transients produced by the sweep jammer signal.
4. Determine the net effect that a sweep jamming signal signal would have on a specific receiver based on the critical electrical and physical properties of both the jamming signal and the targeted receiver.

Accordingly, the object of this invention is to provide a process that can accurately predict a sweep jamming signal's effect on a targeted receiver in terms of the peak BER, the increased background BER, and the resultant average BER, based on the critical physical and electrical properties of the sweep jammer transmitter and its targeted digital radio receiver.

It is another object of this invention to provide a process that can determine whether a targeted receiver will perceive a sweep jamming signal as a sweep jammer, a barrage jammer, or something in between the two.

SUMMARY OF THE INVENTION

In brief, the target radio's signaling curve is known from the critical electronic characteristics of the receiver. The nature of the sweep jammer signal, in terms of its amplitude, and duration (rise and fall time), is known from the sweep jammer's critical electronic characteristics. Both the signalling curve of the targeted receiver, and the shape of the jamming signal are the basis for determining the expected affect of the sweep jammer on the receiver.

From these parameters, the process determines the sweep jammer's effect on the receiver by calculating the signal to noise ratio. The result is analyzed to determine whether the jamming signal is perceived as being purely a sweep jammer, a barrage jammer, or something in between.

In addition, the parameters are used to calculate the sweep jammer's effect on the receiver in terms of the peak BER, and the background BER. The peak and background BERs are used to calculate the sweep jammer's effect on the average BER of the target link.

DESCRIPTION OF THE PREFERRED EMBODIMENT

Figure 1:
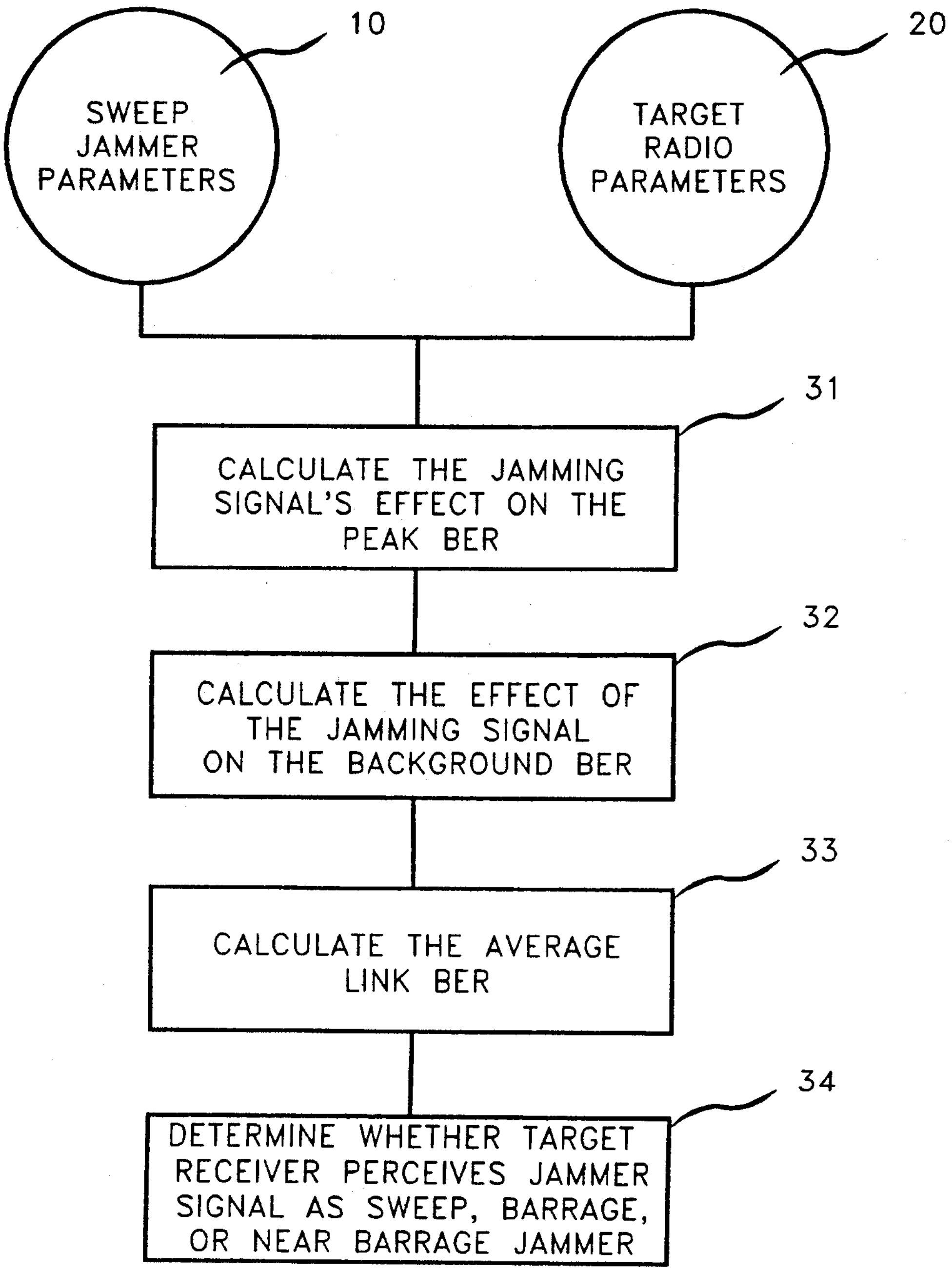
FIG. 1 is a block diagram showing the basic implementation of the invention.

Referring now to FIG. 1, there is shown a simplified block diagram of the invention. As shown, the sweep jammer parameters 10 and the target radio parameters 20, including the target radio's signalling curve, are utilized to determining the effects of the sweep jammer waveform on the targeted receiver.

More specifically, input parameters 10 and 20 are utilized to determine the jamming signal's effect on the target receiver's peak BER 31, background BER 32, and average link BER 33. Average BER 33 indicates the jamming signal's overall effect on the targeted radio communications link. Finally, the process determines whether the receiver perceives the jammer signal as a sweep jammer, a barrage jammer, or a near barrage jammer (34).

As mentioned above, input parameters 10 and 20 make such BER determinations and such jammer identifications possible. To this end, however, the input parameters are first analyzed to determine critical properties of the jammer signal and the target radio receiver. The most important of these properties is the jammer signal profile. Once the jammer signal profile is determined, the process can utilize the targeted receiver's signaling curve to determine BER' 31, 32, and 33.

The input parameters are first utilized to determine the sweep jammer period, the number of digital data bits transmitted during that period, the number of digital data bits affected by the sweep jammer during any one period, and the number of bits unaffected by the sweep jammer's pulse during any one period. In making these determinations, the process takes into account the target receiver's selectivity, the maximum average power level of the sweep jammer's pulse, the spectral width of the jammer's pulse (instantaneous bandwidth), and the receiver's spectral bandwidth (noise equivalent bandwidth). As a general rule, the number of bits affected during one period diminishes, as the level of the jammer's pulse diminishes. This is largely due to the fact that the spectral width of the receiver directly varies as a function of amplitude.

Once these properties are determined, the process then determines the jammer pulse's amplitude as seen by the receiver. This determination, however, depends on whether there is a bandwidth mismatch between the receiver's associated time constant, which is dictated by the receiver's noise equivalent bandwidth, the sweep jammer pulse duration, which is dictated by its instantaneous bandwidth, the sweep rate, and the sweep bandwidth. As such the process takes all this into account.

From this, the process can determine receiver's signal to noise ratio during, and in the absence of, the jammer pulse. The accuracy of this calculation, however, largely depends on the background noise. As such, in determining the background noise the process takes into account whether the receiver can follow the rise and fall time of the leading and trailing edges of the jammer pulse. In this situation, the receiver relaxes and residual RF power remains in the receiver front end. Consequently, the process adds this to the background noise. By considering these factors in determining the signal to noise ratio, the process effectively determines the desired jammer signal profile.

Finally, the process utilizes the jammer signal profile and the receiver curve, mentioned above, to determine the desired BER's 31, 32 and 33.

What is claimed is:

1. A method for predicting the effect of a sweep jamming signal on a targeted radio receiver by calculating said jamming signal's effect on the average link Bit Error Rate of said receiver, comprising the steps of:

calculating said receiver's peak Bit Error Rate which indicates said sweep jamming signal's effect on said target receiver's average Bit Error Rate when the peak of said sweep jamming signal is present within said receiver's bandwidth, said peak Bit Error Rate calculation comprising the steps of calculating the attenuation of said sweep jammer pulse, calculating said receiver's signal to noise ratio during the presence of said sweep jammer pulse, and calculating the associated bit error rate from the signaling curve of said targeted receiver; and calculating said receiver's background Bit Error Rate which indicates said sweep jamming signal's effect on said target receiver's average link Bit Error Rate when said sweep jamming signal is sweeping outside said receiver's bandwidth, said background bit error rate calculation comprising the steps of determining a residual sweep jammer signal level during said jamming signal's sweep outside said receiver's bandwidth, calculating the increase in said receivers background noise floor due to said residual signal, calculating the signal to noise ratio due to said increased background noise floor, and calculating the associated bit error rate from said receiver's signaling curve.

2. The method of claim 1 further comprising the step of:

determining whether said target radio perceives said jamming signal as a sweep jammer, a barrage jammer, or something in-between the two;

3. The method of claim 1 further comprising the steps of:

determining the period of the jamming signal;

determining the bit time by calculating the number of bits transmitted during one period of the jammer;

computing the number of bits in a single jammer pulse repetition period;

calculating the number of bits affected by the sweep jammer pulse by considering the absolute value of the ratio of the jammer signal level to the ambient noise floor;

calculating the transient jammer pulse attenuation;

calculating the amount of additional absolute attenuated jammer power;

determining the attenuated received jammer power from the jammer's pulse duration and the receiver's associated time constant; and determining whether the attenuated jammer transient is being received at a level below or near the computed average background noise floor.

4. The method of claim 1 wherein the calculation of said average link Bit Error Rate is made by a programmed computer.

* * * * *